United States Patent
Bharatia et al.

(10) Patent No.: US 6,615,037 B1
(45) Date of Patent: Sep. 2, 2003

(54) METHOD APPARATUS AND SYSTEM FOR CALL FORWARDING WHEN ROAMING FROM A FIRST TYPE NETWORK TO A SECOND TYPE NETWORK IN A COMMUNICATION SYSTEM

(75) Inventors: Jayshree A. Bharatia, Plano, TX (US); Ronald D. Ryan, Coppell, TX (US)

(73) Assignee: Nortel Networks Limited, St. Laurent (CA)

( * ) Notice: Subject to any disclaimer, the term of this patent is extended or adjusted under 35 U.S.C. 154(b) by 368 days.

(21) Appl. No.: 09/588,376

(22) Filed: Jun. 6, 2000

Related U.S. Application Data

(60) Provisional application No. 60/139,978, filed on Jun. 18, 1999.

(51) Int. Cl.[7] .................................................. H04Q 7/32
(52) U.S. Cl. ........................ 455/414; 455/432; 455/445
(58) Field of Search ................................. 455/414, 417, 455/432, 433, 435, 445, 461

(56) References Cited

U.S. PATENT DOCUMENTS

| | | | |
|---|---|---|---|
| 5,579,375 A | * 11/1996 | Ginter | 379/59 |
| 5,682,481 A | * 10/1997 | Fuyama | 455/432 |
| 5,867,784 A | 2/1999 | Lantto | 455/432 |
| 5,920,812 A | 7/1999 | Palviainen | 455/417 |
| 5,963,866 A | 10/1999 | Palamara et al. | 455/456 |
| 5,978,673 A | 11/1999 | Alperovich et al. | 455/417 |
| 6,021,330 A | 2/2000 | Vannucci | 455/456 |
| 6,023,618 A | 2/2000 | Janhonen et al. | 455/406 |
| 6,138,007 A | * 10/2000 | Bharatia | 455/414 |

* cited by examiner

Primary Examiner—Lee Nguyen

(57) ABSTRACT

An apparatus, system and method for call forwarding when roaming from a first type network, such as an ANSI-41 cellular network, to a second type network, such as a GSM cellular network. According to one embodiment of the present invention, a signaling message converter signals an originating MSC in a local communication system to redirect a call when a terminating foreign MSC cannot terminate the call due to predetermined circumstances.

30 Claims, 2 Drawing Sheets

METHOD APPARATUS AND SYSTEM FOR CALL FORWARDING WHEN ROAMING FROM A FIRST TYPE NETWORK TO A SECOND TYPE NETWORK IN A COMMUNICATION SYSTEM

PROVISIONAL APPLICATION

This application claims the benefit of the filing date of corresponding U.S. Provisional Patent Application No. 60/139,978, entitled "Interworking of Call Forwarding When Roaming From ANSI-41 to GSM," filed Jun. 18, 1999.

RELATED APPLICATION

This application is related to commonly assigned and U.S. patent application Ser. No. 08/980,103 entitled "Methods and Systems for Late Call Forwarding," filed Nov. 26, 1997, which is hereby incorporated by reference.

FIELD OF THE INVENTION

The present invention is directed to a method, apparatus and system for call forwarding when roaming from a first type network to a second type network in a communication system. More specifically, the present invention relates in general to cellular communication systems and in particular to a method and apparatus for completing call forwarding when a dial mode ANSI-41 mobile subscriber has roamed to a GSM network and a call to that mobile subscriber is not terminated.

BACKGROUND OF THE INVENTION

Cellular telephones have become increasingly prevalent in today's society. The cellular telephone makes use of a cellular network and traditional telephone networks to route calls using radio communication signals. Two types of cellular networks have evolved—Global Systems for Mobile communications (GSM) and American National Standards Institute-41 (ANSI-41) type networks. ANSI-41 is also sometimes referred to as IS 41 (TIA/EIA [Telecommunications Industry Association/Electronic Industries Association] Interim Standard 41).

The two types of cellular networks use message formats that are not completely compatible with one another as they are. Thus, if a mobile subscriber (MS) using cellular communication, roams from one type of network to another, the messages sent by the MS may not be understood by the network into which it roams unless some sort of conversion is performed. In order to allow roaming between "foreign" type networks, a signaling message converter, referred to herein as an IWU (InterWorking/interoperability Unit) operates to interconnect calling and called Mobile services Switching Centers (MSCs). The IWU passes signaling messages back and forth between network entities while converting the format of these messages such that the messages can be properly interpreted by the receiving MSC.

However, even with known signal message converters, GSM standards are inherently different from the ANSI-41 standards mentioned above. One of these differences is in the operation of "late call forwarding" or the action of the system when a call to a mobile subscriber (MS) cannot be terminated, i.e. connection completed, for any of several specific reasons like call collision, no page response of a page request sent to the called MS, and the like. A GSM system expects the terminating Mobile service Switching Center (MSC) to handle the call forwarding while an ANSI-41 system expects the originating or home MSC of the MS to handle the call forwarding.

As is known by those skilled in the art, call forwarding may occur when a call, to a given MS, cannot be terminated. The call forwarding can be "early" or "late". Early call forwarding is defined as occurring when a contact with the MS has failed due to predetermined circumstances occurring while attempting to extend the call to another network. Late call forwarding is defined as occurring when call forwarding is initiated after the call has been extended to the last known "foreign" public land mobile network location and contact with the MS has failed due to predetermined circumstances.

In view of the above, it would be advantageous to have a converter mechanism that provides for late call forwarding from the originating MSC when a MS roams from an ANSI-41 network to a GSM network.

SUMMARY OF THE INVENTION

The present invention provides an apparatus, system and method for call forwarding when roaming from a first type network to a second type network.

According to one embodiment of the present invention, a signaling message converter signals an appropriate MSC in a local communication system to redirect a call when a terminating foreign MSC cannot terminate the call due to various circumstances. In a preferred embodiment, the calling party is located in a local communication system while the called party is in a foreign communication system. Once it is determined that the call cannot be terminated at the called party's communication device in the foreign communication system, a call redirect message is sent to an appropriate MSC of the local communication system. In response to receiving the call redirect message, a call forwarding number is identified. The communication connection between the local communication system and the foreign communication system is released and a communication connection to the communication device associated with the call forwarding number is thereafter attempted.

Thus, with the present invention, call forwarding from an originating MSC can be accomplished when the called party is located in a foreign communication system. Other features and advantages of the present invention will be described in, or will become apparent to those of ordinary skill in the art in view of, the following detailed description of the preferred embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

DETAILED DESCRIPTION OF THE PREFERRED EMBODIMENT

Figure 1:
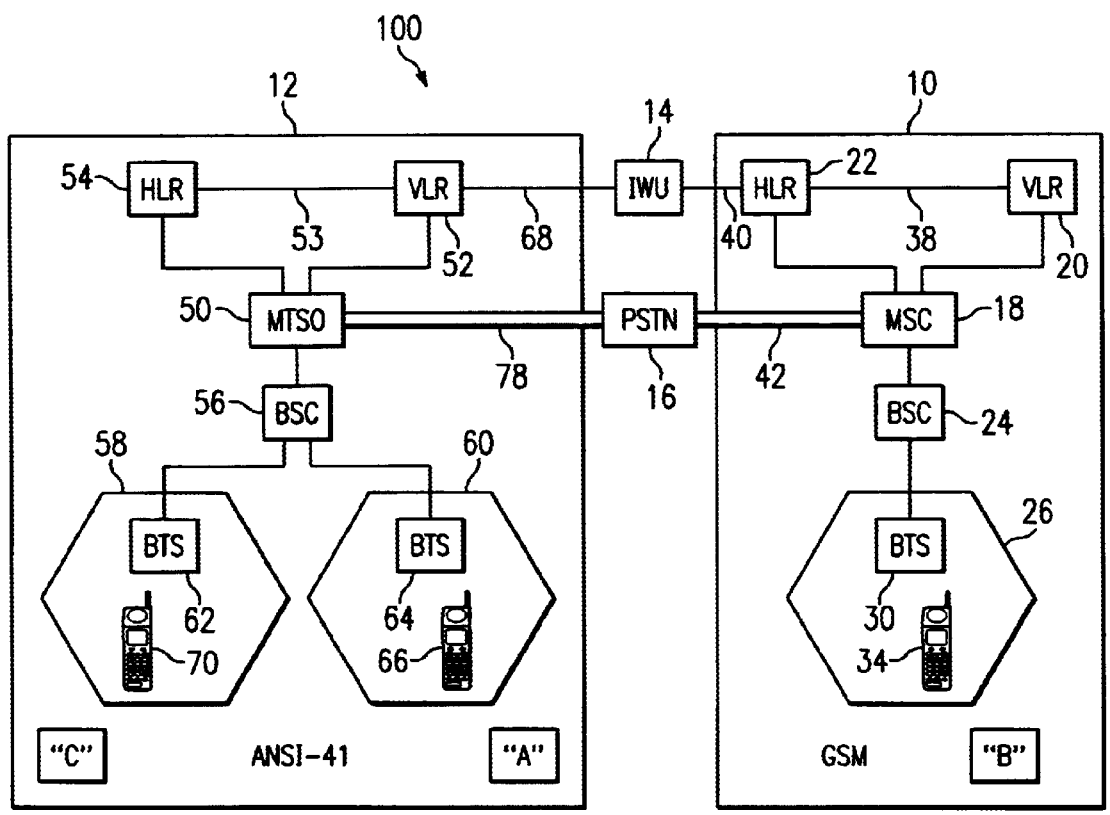
FIG. 1 is an exemplary block diagram of a communication system according to the present invention.

FIG. 1 is an exemplary diagram illustrating a cellular communication system 100 according to the present invention. In FIG. 1 a GSM cellular network 10 in its basic configuration is shown along with a basic and similar ANSI-41 cellular network 12. Also shown is an InterWorking/interoperability Unit (IWU) 14 and a Public Switched Telephone Network (PSTN) 16.

GSM cellular network 10 includes a Mobile services Switching Center (MSC) 18 connected to a Visitor Location Register (VLR) 20 and to a Home Location Register (HLR) 22. An additional direct connection 38 is illustrated between VLR 20 and HLR 22. The MSC 18 is connected to a Base Station Controller (BSC) 24 which has a connection to a Base Transceiver Station (BTS) 30 within cell 26. Mobile Subscriber (MS) 34 communicates with BTS 30 within cell 26. The HLR 22 is connected via a message channel 40 to the IWU 14. A voice channel 42 connects the MSC 18 to a PSTN 16.

ANSI-41 cellular network 12 includes a Mobile Telecommunications Switching Office (MTSO) 50 connected to a VLR 52 and also to an HLR 54. A MTSO is the ANSI-41 counterpart of an MSC in a GSM cellular network and may in some cases herein be referred as an MSC. An additional connection 53 is shown for supplying messages directly between the VLR 52 and the HLR 54. A BSC 56 is connected to MTSO 50. The BSC 56 is further connected to a BTS 62 within a cell 58. A further BTS 64 within a cell 60 is also connected to BSC 56. A message link 68 is shown interconnecting IWU 14 and VLR 52. A voice channel 78 is shown interconnecting PSTN 16 and MTSO 50. Within cell 60 there is shown a MS 66. Within cell 58 is another MS 70.

For the purposes of the following description, mobile subscriber 34 will be considered a dual mode transceiver unit which is designed to operate and locally communicate in either a GSM or an ANSI-41 type network. For illustrative purposes and in conjunction with following figures, mobile subscriber 34 will be also designated as being operated by a user, customer "B". Mobile subscriber 70 is further designated as being used by a customer "C" such that calls from mobile subscriber 66 (customer "A") that cannot be terminated with mobile subscriber 34 (customer "B") are to be forwarded to mobile subscriber 70 (customer "C").

The Visitor Location Registers (VLRs) 20 and 52 are network entities responsible for storing roaming information related to a mobile subscriber. The roaming information includes information related to the identity of the mobile subscriber as well as address information to be used for contacting the roaming mobile subscriber.

The Home Location Registers (HLRs) 22 and 54 are network entities responsible for storing subscription information related to mobile subscribers for which the respective networks 10 and 12 are the mobile subscribers' home networks. Such information may include, for example, identities of the mobile subscribers, address information for use when calling the mobile subscribers, call forwarding information, and the like.

The BTS 30, 62 and 64 send and receive cellular communications to and from the mobile subscribers 34, 66 and 70. The BSCs 24 and 56 route cellular communications to the appropriate cell 58, 60 or 26, based on routing information supplied by the MSC 18 or MTSO 50, and coordinates communications between BTSs (e.g., handoff between BTSs). The MSC 18 and MTSO 50 provide cellular communication services based on information obtained from the HLRs and VLRs of the respective networks 10 and 12. The MSC 18 and MTSO 50 provide routing information to the BSCs 56 and 24 for use in routing the cellular communication to an appropriate cell in which the receiving mobile subscriber is located. The BSC is a base station controller which coordinates calls between BTSs (e.g., handoff between BTSs).

The MSC, VLR and HLR entities may or may not be co-located. If they are not co-located, the MSC is responsible for transferring information to and from the VLR and HLR whenever applicable.

In the present invention, an originating MSC refers to a switch which provides an interface between a local network and an external or foreign network (i.e. GSM or ANSI-41). This originating MSC is in charge of 1) fetching location information for MSs visiting external networks and 2) routing calls toward the switch (MSC) in the external network through which the subscriber can obtain service at that instant.

Although as shown in the accompanying drawings, the originating MSC and the home MSC, of the roaming MS are the same unit for ease of illustration, these two terms may also refer to two different MSCs. It should also be noted that although the originating caller is shown as an ANSI-41 MS 66 and the phone to which the call is forwarded is shown as a ANSI-41 MS 70, the MS 70 may be a land line phone, GSM MS, and/or a phone of a completely different type of network from the GSM and ANSI-41 networks shown.

Figure 2:
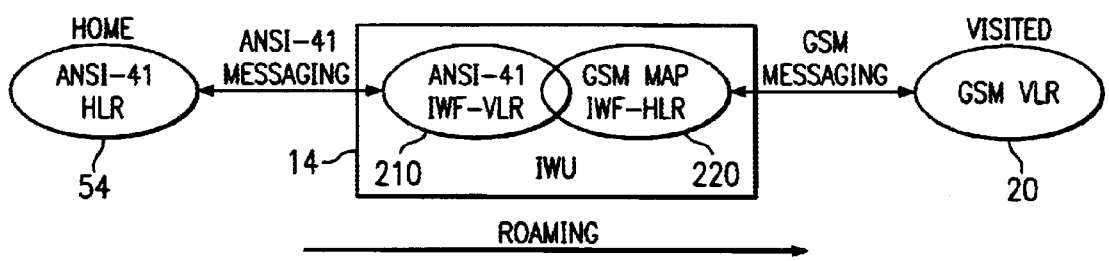
FIG. 2 is an exemplary block diagram of the interworking/interoperability unit according to the present invention.

In addition to the VLRs and HLRs of the respective ANSI-41 and GSM networks 10 and 12, the IWU 14 also maintains a VLR functionality 210 and HLR Mobility Application Protocol (MAP) functionality 220 as shown in FIG. 2. MAP is a protocol generally known in the art. The IWU VLR 210 and HLR MAP 220 functionalities are used for converting messages received in ANSI-41 network 12 format into GSM network 10 format, as shown in FIG. 1, and vice versa.

As shown in FIG. 2, the IWU 14 maintains a VLR functionality 210 for the roaming ANSI-41 MS 34 and a HLR MAP functionality 220 for the GSM network 10. The IWU 14 may be a separate unit as shown in FIGS. 1 and 2 or may be incorporated into one or more of the GSM HLR 22, GSM VLR 20, ANSI HLR 54 or VLR 52. Thus, any combination of the IWU 14 with these elements 20,22, 52 and 54 may be utilized without departing from the spirit and scope of the present invention. For purposes of clarity of the following description of the preferred embodiments, a separate IWU unit 14 is assumed.

When a subscriber to an ANSI-41 network 12, for example, roams from the ANSI-41 network into the GSM network 10, the IWU 14 acts as an ANSI-41 VLR for the ANSI-41 network and a GSM HLR for the GSM network. Messages related to call termination sent from the ANSI-41 network 12 to the GSM network 10 are first routed using ANSI-41 messaging to the IWU 14. The IWU 14 determines routing information in the GSM network 10 by using subscriber B registration information in IWU 14.

The IWU 14 receives the message from the ANSI-41 network 12 and, using the ANSI-41 IWU VLR functionality 210 and the GSM MAP IWU HLR functionality 220, converts the message into a GSM format. Thereafter, GSM messaging may be performed with GSM VLR to determine appropriate routing information to the roaming MS 34.

The present invention is directed to the situation when a call from a calling MS 66 to a roaming MS, such as MS 34 in the GSM network 10, cannot be terminated, i.e. completed to the called MS 34. In such a situation, late call forwarding may be permitted, using the present invention, such that the call is forwarded by the originating MSC to another destination, such as MS 70, and terminated at that location. This situation, and the differences between the prior art and the present invention, will be described with reference again to FIG. 1, and with further reference to the message flow diagrams of FIGS. 3A and 3B.

For purposes of explanation it will be assumed that the MTSO 50 is an originating MSC, in addition to being a home location MSC for MS 34, and that both mobile subscribers 66 and 70, representing customers "A" and "C", respectively, are under control of originating MSC 50. Further, it is assumed in this example that both mobile subscribers 66 and 70 use the same VLR 52 and the same HLR 54. It will also be assumed that the GSM and ANSI-41 networks 10 and 12 are configured for Optimal Routing. Within the standards of Optimal Routing, a routing of a call to a roaming MS can be prepared for as follows. In ANSI-41 systems, the address of the ANSI-41 originating MSC, i.e. MTSO 50, is included in the location request message sent to the HLR 54. This information is also provided as part of the route request message that is sent to the IWU 14 (also called a gateway) when calling a roaming ANSI-41 subscriber, such as MS 34, presently located in the environment of the GSM network 10. Thus the HLR 54 and IWU 14 are provided the address information needed to contact the ANSI-41 gateway MSC 50 when necessary.

Figure 3A:
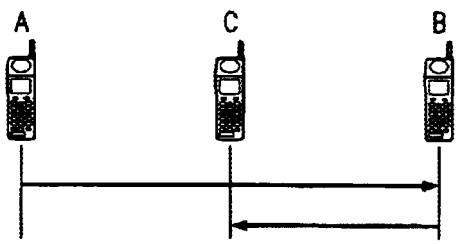
FIG. 3A is an exemplary message flow diagram illustrating call forwarding according to known systems.

FIG. 3A is an exemplary diagram illustrating the prior art method of call forwarding when a call cannot be terminated at the called MS. As shown in FIG. 3A, a call originates from mobile subscriber "A" and is to be terminated at the mobile subscriber "B". However, if the call cannot be terminated with mobile subscriber "B", the call is forwarded by the terminating MSC, i.e. the MSC associated with the network in which mobile subscriber "B" is located, to a mobile subscriber "C". Thus, late call forwarding is performed from the terminating MSC.

Figure 3B:
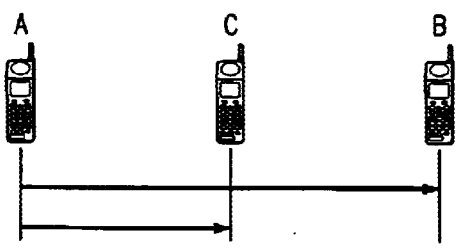
FIG. 3B is an exemplary message flow diagram illustrating call forwarding according to the present invention.

FIG. 3B is an exemplary diagram illustrating the method of call forwarding according to the present invention. As shown in FIG. 3B, a call originates from mobile subscriber "A" and is to be terminated at the mobile subscriber "B". However, if the call cannot be terminated with mobile subscriber "B", the call is forwarded by the originating MSC, i.e. the MSC associated with the network in which mobile subscriber "A" is located, to a mobile subscriber "C". Thus, late call forwarding is performed from the originating MSC.

Thus, the present invention provides a mechanism by which late call forwarding can be accomplished by the originating MSC. The details of the messaging used to accomplish the features of the present invention will now be described with reference to the message flow diagram of FIG. 4 and again with reference to the elements in FIG. 1.

Figure 4:
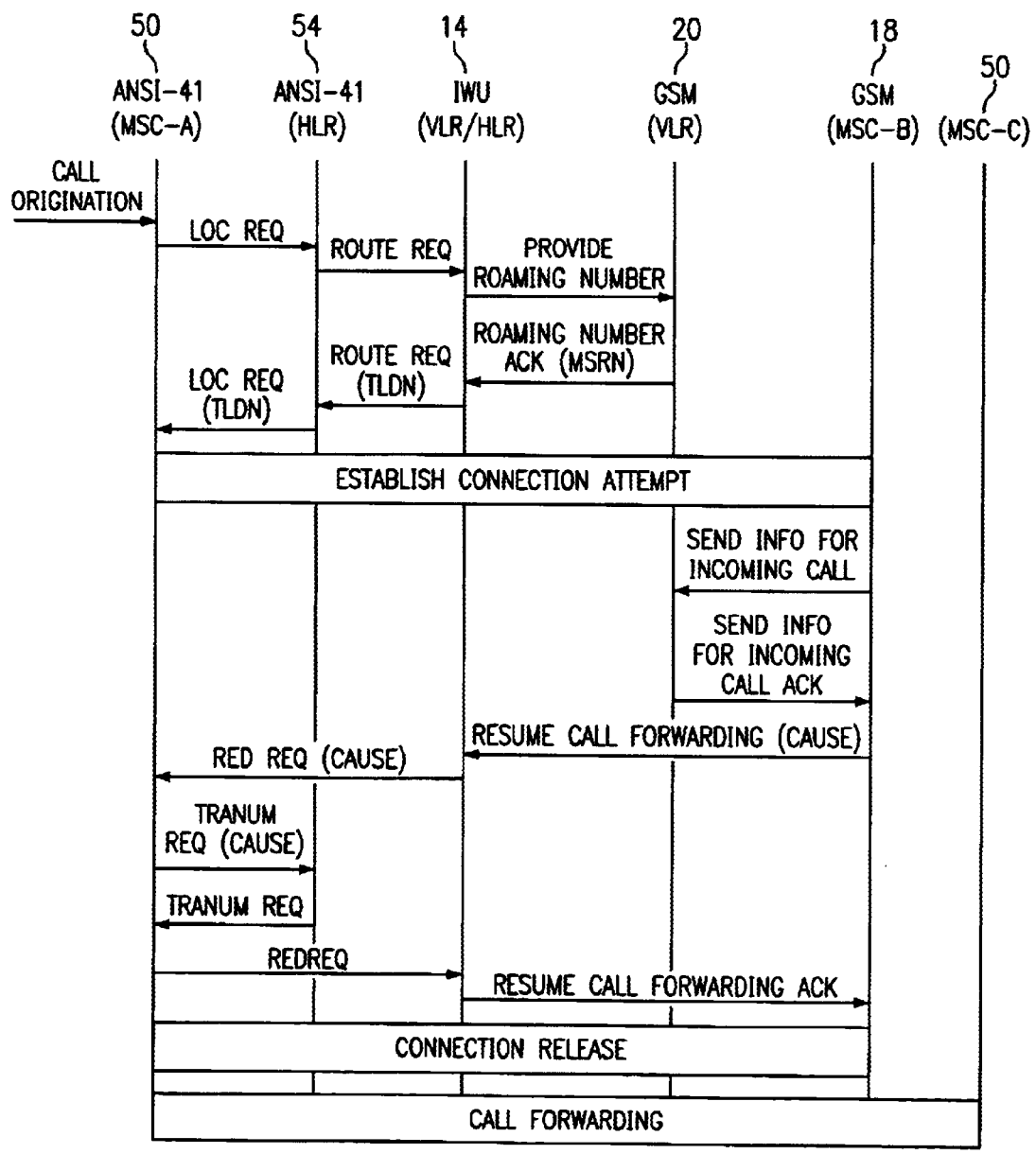
FIG. 4 is an exemplary message flow diagram according to the present invention.

As shown in FIG. 1, and with further reference to FIG. 4, when mobile subscriber 66 attempts to call mobile subscriber 34, a call origination message is transmitted to the originating MSC 50, i.e. MTSO 50. The call origination procedure uses the address of mobile subscriber 34 as a subscriber address. As shown, the home MTSO 50 of MS 34 is also an originating MSC 50 and thus, the routing address of the home MTSO 50 and the originating MSC 50 are identical. Assuming that home location of mobile subscriber 34 is recorded in the HLR 54 at the time of subscriber registration, in accordance with known methods, a location request message is sent from the originating MSC 50 to the HLR 54 to obtain routing information. The HLR 54 sends a route request message to the IWU 14 for the purpose of obtaining a roaming number. If the last operational contact of mobile subscriber 34 was within GSM network 10, its location at that time is recorded in the IWU 14 as a part of an update location function. If IWU 14 finds mobile subscriber 34 in its database, IWU 14 relays a provide roaming number message to the GSM VLR 20.

The GSM VLR 20 then returns a roaming number acknowledgement message with a roaming number to be used as a Mobile Subscribing Routing Number (MSRN). The IWU 14 changes the format of the MSRN to a Temporary Location Directory Number (TLDN) format, used by the ANSI-41 network 12, and provides this number in an acknowledgement message to the HLR 54. The HLR 54 relays this information within a location request acknowledgement message to gateway MSC 50.

The originating MSC 50 starts a call setup procedure set of messages using voice channels 42 and 78 and using the provided subscriber address of mobile subscriber 34 within GSM network 10. If MSC 18 cannot terminate the call for reasons such as call collision, MS 34 being unavailable, no answer after alerting, or no response, a "send information for incoming call message" is returned from MSC 18 to VLR 20. The VLR 20 responds with a "send information for incoming call" acknowledgement message that includes information pertaining to the called roaming MS 34.

In response to receiving the acknowledgement message from the GSM VLR 20, the GSM MSC 18 sends a "resume call forwarding" message to the IWU 14. The "resume call forwarding" message is a message that instructs the IWU 14 to perform call forwarding. This message also includes information identifying the cause of the inability to terminate the call with MS 34. This information may later be used, for example, to determine which call forwarding number to use when forwarding the call to another destination location.

When the "resume call forwarding" message is received by the IWU 14 subsequent to the failure of a call being terminated in the GSM network 10, the IWU 14 of the present invention sends a redirection request (RED REQ) to the ANSI-41 originating MSC 50. The redirection request message is a message requesting information for use in redirecting the call to another termination point.

The ANSI-41 gateway MSC 50 then sends a request (TRANUM REQ) for a call forwarding number to the ANSI-41 HLR 54. If the call forwarding number is available, the call forwarding number is sent from the ANSI-41 HLR 54 to the ANSI-41 originating MSC 50. This call forwarding number may be determined based on, for example, information stored in the HLR 54 as well as the information identifying the cause of the inability to terminate the call.

The ANSI-41 originating MSC 50 then responds to the IWU 14 with a "redirection request" response (red req) message. Upon receipt of the "redirection request" response message, the IWU 14 sends a "resume call forwarding" acknowledgement message to the GSM terminating MSC 18 and at the same time releases the connection between the ANSI-41 originating MSC 50 and GSM terminating MSC and 18. Thereafter, if the call forwarding number is available, the ANSI-41 originating MSC 50 can then attempt to establish a connection using the call forwarding number as routing information to the MS 70.

Thus, the present invention provides a system, apparatus and method by which call forwarding may be performed when a mobile subscriber roams into a foreign network. In this way, calls that are unable to be terminated at the roaming mobile subscriber may be redirected to another number, such as another telephone number, a voice mail number, or the like, where the calling party may have an opportunity to contact the called party, leave a message for the called party, or speak with someone who may be able to provide information to the calling party. The present invention has a primary difference between the prior art of performing late call forwarding from the originating MSC rather than the terminating MSC. This allows late call forwarding to be performed in accordance with the expectations of the ANSI-41 network architecture even when a mobile subscriber roams into a GSM network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An interworking/interoperability unit apparatus for exchanging signaling messages between a first communication system and a second communication system when a mobile subscriber roams from the first communication system into the second cellular communication system, comprising:

means for receiving a resume call forwarding message from the second communication system; and means for sending a redirection request message to the first communication system in response to receiving the resume call forwarding message from the second communication system.

2. The interworking/interoperability apparatus of claim 1, further comprising:

means for sending a resume call forwarding acknowledgement message to the second communication system in response to receiving a redirection request message acknowledgement message from the first communication system;

means for releasing a connection between the first communication system and the second communication system; and means for performing call forwarding based on a call forwarding number.

3. The interworking/interoperability apparatus of claim 1, wherein the first communication system is an ANSI-41 cellular communication and the second communication system is a GSM cellular communication system.

4. A method of performing call forwarding when a mobile subscriber roams from a first communication network to a second communication network, comprising:

receiving a resume call forwarding message from the second communication network;

sending a redirection request message to the first communication network in response to receiving the resume call forwarding message;

receiving a call forwarding number in response to sending the redirection request; and performing call forwarding based on the call forwarding number.

5. The method of claim 4, wherein the first communication network is an ANSI-41 cellular network.

6. The method of claim 4, wherein the second communication network is a GSM cellular network.

7. The method of claim 4, further comprising:

receiving a redirection request acknowledgement message from the first communication network in response to sending the redirection request;

sending a resume call forwarding acknowledgement message to the second communication network in response to receiving the redirection request acknowledgement message; and releasing a connection between the first communication network and the second communication network.

8. The method of claim 4, wherein performing call forwarding includes:

receiving a routing request from the first communication network having a call forwarding number;

sending a provide roaming number message to a visitor location register of the second communication network;

receiving a roaming number acknowledgement message from the visitor location register, the roaming number acknowledgement message including a roaming number of the call forwarding number; and sending the roaming number to the first communication network.

9. The method of claim 8, wherein the roaming number is converted from a first format used by the second communication network into a second format used by the first communication network.

10. The method of claim 9, wherein the roaming number in the first format is a mobile subscriber routing number and the roaming number in the second format is a temporary location directory number.

11. A communication system, comprising:

a first communication network;

a second communication network; and an interworking/interoperability unit coupled to the first communication network and the second communication network, wherein the interworking/interoperability unit receives a resume call forwarding message from the second communication network, sends a redirection request message to the first communication network in response to receiving the resume call forwarding message, receives a call forwarding number in response to sending the redirect request, and performs call forwarding based on the call forwarding number.

12. The system of claim 11, wherein the first communication network is an ANSI-41 cellular network.

13. The system of claim 11, wherein the second communication network is a GSM cellular network.

14. The system of claim 11, wherein the interworking/interoperability unit receives a redirection request acknowledgement message from the first communication network in response to sending the redirection request, sends a resume call forwarding acknowledgement message to the second communication network in response to receiving the redirection request acknowledgement message, and releases a connection between the first communication network and the second communication network.

15. The system of claim 11, wherein the interworking/interoperability unit performs call forwarding by receiving a routing request from the first communication network having a call forwarding number, sending a provide roaming number message to a visitor location register of the second communication network, receiving a roaming number acknowledgement message from the visitor location register, the roaming number acknowledgement message including a roaming number of the call forwarding number, and sending the roaming number to the first communication network for use in establishing a connection to a communication device associated with the call forwarding number.

16. The system of claim 15, wherein the interworking/interoperability unit converts the roaming number from a first format used by the second communication network into a second format used by the first communication network.

17. The method of claim 16, wherein the roaming number in the first format is a mobile subscriber routing number and the roaming number in the second format is a temporary location directory number.

18. A computer program product in a computer readable medium for performing call forwarding when a mobile subscriber roams from a first communication network to a second communication network, comprising:
first instructions for receiving a resume call forwarding message from the second communication network;
second instructions for sending a redirection request message to the first communication network in response to receiving the resume call forwarding message;
third instruction for receiving a call forwarding number in response to sending the redirection request; and
fourth instructions for performing call forwarding based on a call forwarding number.

19. The computer program product of claim 18, wherein the first communication network is an ANSI-41 cellular network.

20. The computer program product of claim 18, wherein the second communication network is a GSM cellular network.

21. The computer program product of claim 18, further comprising:
fifth instruction for receiving a redirection request acknowledgement message from the first communication network in response to sending the redirection request;
sixth instructions for sending a resume call forwarding acknowledgement message to he second communication network in response to receiving the redirection request acknowledgement message; and
seventh instructions for releasing a connection between the first communication network and the second communication network.

22. The computer program product of claim 18, wherein the fourth instructions include:
instructions for receiving a routing request from the first communication network having a call forwarding number;
instructions for sending a provide roaming number message to a visitor location register of the second communication network;
instructions for receiving a roaming number acknowledgement message from the visitor location register, the roaming number acknowledgement message including a roaming number of the call forwarding number; and
instructions for sending the roaming number to the first communication network.

23. The computer program product of claim 22, wherein the instructions for sending the roaming number to the first communication network includes instructions for converting the roaming number from a first format used by the second communication network into a second format used by the first communication network.

24. The computer program product of claim 23, wherein the roaming number in the first format is a mobile subscriber routing number and the roaming number in the second format is a temporary location directory number.

25. A method of late call forwarding, comprising:
receiving a call from an originating mobile services switching center in a first communication network destined for a terminating mobile subscriber in a second communication network; and
forwarding, by the originating mobile services switching center, the call to another mobile subscriber if the terminating mobile subscriber is unable to terminate the call, wherein forwarding the call to another mobile subscriber includes:
receiving a resume call forwarding message from the second communication network;
sending a redirection request message to the first communication network in response to receiving the resume call forwarding message;
receiving a call forwarding number in response to sending the redirection request; and
performing call forwarding based on the call forwarding number.

26. The method of claim 25, wherein the first communication network is an ANSI-41 cellular network and the second communication network is a GSM cellular network.

27. The method of claim 25, wherein forwarding the call to another mobile subscriber further includes:
receiving a redirection request acknowledgement message from the first communication network in response to sending the redirection request;
sending a resume call forwarding acknowledgement message to the second communication network in response to receiving the redirection request acknowledgement message; and
releasing a connection between the first communication network and the second communication network.

28. The method of claim 25, wherein performing call forwarding includes:
receiving a routing request from the first communication network having a call forwarding number;
sending a provide roaming number message to a visitor location register of the second communication network;
receiving a roaming number acknowledgement message from the visitor location register, the roaming number acknowledgement message including a roaming number of the call forwarding number; and
sending the roaming number to the first communication network.

29. The method of claim 28, wherein the roaming number is converted from a first format used by the second communication network into a second format used by the first communication network.

30. The method of claim 29, wherein the roaming number in the first format is a mobile subscriber routing number and the roaming number in the second format is a temporary location directory number.

* * * * *

UNITED STATES PATENT AND TRADEMARK OFFICE
CERTIFICATE OF CORRECTION

PATENT NO.    : 6,615,037 B1
DATED         : September 2, 2003
INVENTOR(S)   : Bharatie et al.

It is certified that error appears in the above-identified patent and that said Letters Patent is hereby corrected as shown below:

Column 7,
Line 64, after "cellular communication" insert -- system --.

Column 8,
Line 56, after "sending the", delete "redirect" and insert -- redirection --.

Column 9,
Line 20, after "17. The", delete "method" and insert -- system --.
Line 33, after "third", delete "instruction" and insert -- instructions --.
Line 45, after "fifth", delete "instruction" and insert -- instructions --.
Line 50, after "to", delete "he," and insert -- the --.

Signed and Sealed this

Eighteenth Day of May, 2004

JON W. DUDAS
*Acting Director of the United States Patent and Trademark Office*